(12) United States Patent
Wright, Sr.

(10) Patent No.: US 9,203,798 B2
(45) Date of Patent: Dec. 1, 2015

(54) TIME BASED IP ADDRESS HOPPING

(71) Applicant: EMPIRE TECHNOLOGY DEVELOPMENT LLC, Wilmington, DE (US)

(72) Inventor: David D. Wright, Sr., Santa Cruz, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/118,992

(22) PCT Filed: Jul. 18, 2013

(86) PCT No.: PCT/US2013/051136
§ 371 (c)(1),
(2) Date: Nov. 20, 2013

(87) PCT Pub. No.: WO2015/009308
PCT Pub. Date: Jan. 22, 2015

(65) Prior Publication Data
US 2015/0026363 A1 Jan. 22, 2015

(51) Int. Cl.
*G06F 15/16* (2006.01)
*H04L 29/12* (2006.01)

(52) U.S. Cl.
CPC ......... *H04L 61/2053* (2013.01); *H04L 61/2007* (2013.01)

(58) Field of Classification Search
CPC ............... H04L 29/12066; H04L 61/1511
USPC ........................................................ 709/245
See application file for complete search history.

(56) References Cited

U.S. PATENT DOCUMENTS

| | | | | |
|---|---|---|---|---|
| 6,880,090 | B1 * | 4/2005 | Shawcross | H04L 12/18 709/225 |
| 6,981,146 | B1 | 12/2005 | Sheymov | |
| 7,353,388 | B1 * | 4/2008 | Gilman | H04L 63/06 713/168 |
| 8,750,297 | B2 * | 6/2014 | Liu | 370/389 |
| 8,819,283 | B2 * | 8/2014 | Richardson | H04L 29/12066 709/226 |
| 2003/0069981 | A1 * | 4/2003 | Trovato | H04L 29/06 709/228 |
| 2003/0149783 | A1 * | 8/2003 | McDaniel | H04L 29/12009 709/231 |
| 2004/0103205 | A1 * | 5/2004 | Larson | H04L 63/10 709/229 |

(Continued)

FOREIGN PATENT DOCUMENTS

| | | |
|---|---|---|
| WO | 9965197 | 12/1999 |
| WO | PCT/US13/51136 | 7/2013 |

OTHER PUBLICATIONS

International Searching Authority, International Search Report and Written Opinion for PCT/US13/51136, Oct. 21, 2013, 9 pages.

(Continued)

*Primary Examiner* — David X Yi
*Assistant Examiner* — Atta Khan
(74) *Attorney, Agent, or Firm* — Jensen & Puntigam, PS

(57) ABSTRACT

Technologies related to time based IP address hopping are generally described. In some examples, IP communications may involve IP network nodes including source nodes, which may configure and send IP packets via a network, gateway nodes, which may receive IP packets from the network and may send the IP packets to end point nodes, and end point nodes. The IP network nodes may hop between different IP addresses, which different IP addresses may be identified at least in part using shared time values.

15 Claims, 5 Drawing Sheets

(56) References Cited

U.S. PATENT DOCUMENTS

| | | | |
|---|---|---|---|
| 2004/0123143 A1* | 6/2004 | Katz | H04L 29/12009 726/3 |
| 2005/0220017 A1* | 10/2005 | Brand et al. | 370/230.1 |
| 2011/0047289 A1* | 2/2011 | Venkatachalam | H04W 72/085 709/237 |
| 2011/0277032 A1* | 11/2011 | Vargas | H04L 63/0428 726/23 |
| 2013/0067222 A1 | 3/2013 | Munger | |
| 2014/0304386 A1* | 10/2014 | Lyon | H04L 41/00 709/223 |

OTHER PUBLICATIONS

Seffers, "U.S. Army Developing Mighty Morphing Network", Article, Aug. 2, 2012, 2 pages.

Khattab, "Roaming Honeypots for Mitigating Service-level Denial-of-Service Attacks", Article, 2004, 10 pages.

Kewley, "Dynamic Approaches to Thwart Adversary Intelligence Gathering", Article, 2001, 10 pages.

"Defense Tactics for Distributed Denial of Service Attacks," Federal Computer Incident Response Center, Global Integrity Corporation, pp. 1-15, 2000.

* cited by examiner

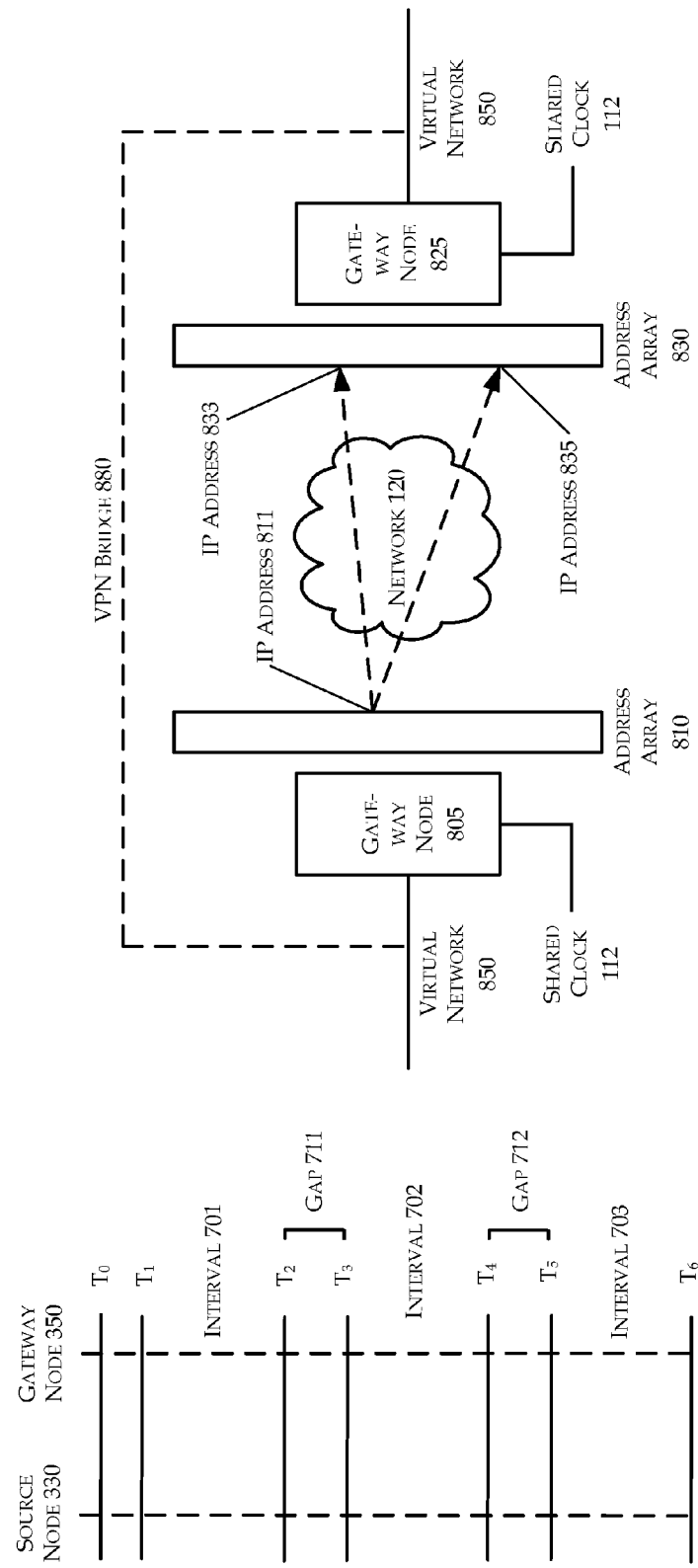

TIME BASED IP ADDRESS HOPPING

CROSS-REFERENCE TO RELATED APPLICATION

The present application is a U.S. National stage filing under 35 U.S.C. §371 of International Application No. PCT/US13/51136, entitled "TIME BASED IP ADDRESS HOPPING", filed on Jul. 18, 2013, the entire contents of which are incorporated herein by reference.

BACKGROUND

Unless otherwise indicated herein, the materials described in this section are not prior art to the claims in this application and are not admitted to be prior art by inclusion in this section.

There are a variety of significant threats relating to electronic communications. For example, eavesdropping generally involves unauthorized interception, access, and/or storing of electronic information, which information can be used to further criminal activity such as identity theft and extortion. In another example, Denial of Service (DoS) attacks overwhelm servers so they can no longer function as intended. Unfortunately these and other attacks are not uncommon, and without adequate security measures, anyone can be affected. Therefore, by way of example, there is an ongoing need in the industry to improve technologies relating to securing electronic communications.

SUMMARY

The present disclosure generally describes technologies including devices, methods, and computer readable media relating to Internet Protocol (IP) communications employing time based IP address hopping. Example IP communications may be performed by IP network nodes, e.g., source nodes, which may configure and send IP packets via a network, gateway nodes, which may receive IP packets from the network and may send the IP packets to end point nodes, and end point nodes. Each IP network node may optionally perform methods according to this disclosure to implement time based IP address hopping, wherein nodes hop between different IP addresses, and wherein the different IP addresses may be identified at least in part using shared time values.

Some example IP communication methods may be performed by an example computing device implementing a source node. Example methods may comprise identifying a first IP address from a set of IP addresses supported by a gateway node. The first IP address may be identified using a first shared time value and a shared secret. The shared time value and shared secret may be shared, e.g., by the source node computing device and a gateway node device.

Having identified the first IP address, the source node computing device may configure first IP packets for sending to an end point node served by the gateway node, e.g., by inserting the first IP address as the destination address in the first IP packets, and the source node computing device may send the first IP packets via a network.

Subsequent to identifying the first IP address, the source node computing device may identify a second IP address from the set of IP addresses supported by the gateway node. The second IP address may be identified using a second shared time value and the shared secret.

Having identified the second IP address, the source node computing device may configure second IP packets for sending to the end point node, e.g., by inserting the second IP address as the destination address in the second IP packets, and may send the second IP packets via the network. The source node computing device may also discontinue use of the first IP address as the destination address for IP packets for sending to the end point node.

Example methods may proceed by sequentially identifying, subsequent to identifying the second IP address, up to a number N of IP addresses as appropriate, configuring IP packets by inserting identified IP addresses as destination addresses, sending IP packets via the network, and discontinuing use of previously identified IP addresses.

Some example IP communication methods performed by a gateway computing device implementing a gateway node may also comprise identifying a first IP address from a set of IP addresses supported by the gateway node. The first IP address may be identified using the first shared time value and the shared secret, e.g., the same shared time value and shared secret as used at the source node, leading to identification at the gateway node of the same first IP address as that identified at the source node.

Having identified the first IP address, the gateway node may assign the first IP address to an end point node served by the gateway node, and the gateway node may send IP packets addressed to the first IP address to the end point node. The IP packets addressed to the first IP address may comprise, e.g., IP packets originating from the source node.

Subsequent to identifying the first IP address, the gateway node may identify the second IP address from the set of IP addresses supported by the gateway node. The second IP address may be identified using the second shared time value and the shared secret, e.g., the same shared time value and shared secret as used at the source node, leading to identification of a same second IP address at the gateway node as that identified at the source node.

Having identified the second IP address, the gateway node may assign the second IP address to the end point node, and the gateway node may send IP packets addressed to the second IP address to the end point node. The gateway node may also discontinue sending IP packets addressed to the first IP address to the end point node.

Example methods may proceed by sequentially identifying, subsequent to identifying the second IP address, up to a number N of IP addresses as appropriate, assigning the identified IP addresses to the end point node, sending IP packets addressed to the identified IP addresses to the end point node, and discontinuing sending IP packets addressed to previously used IP addresses to the end point node.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may comprise a processor, a memory, and IP communication technologies configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following descrip

FIG. 7 is a schematic diagram illustrating an example series of burst intervals separated by communication gaps, wherein a source node and a gateway node may hop between IP addresses at each burst interval; and FIG. 8 is a block diagram illustrating example IP communications between gateway nodes, all arranged in accordance with at least some embodiments of the present disclosure.

DETAILED DESCRIPTION

Figure 1:
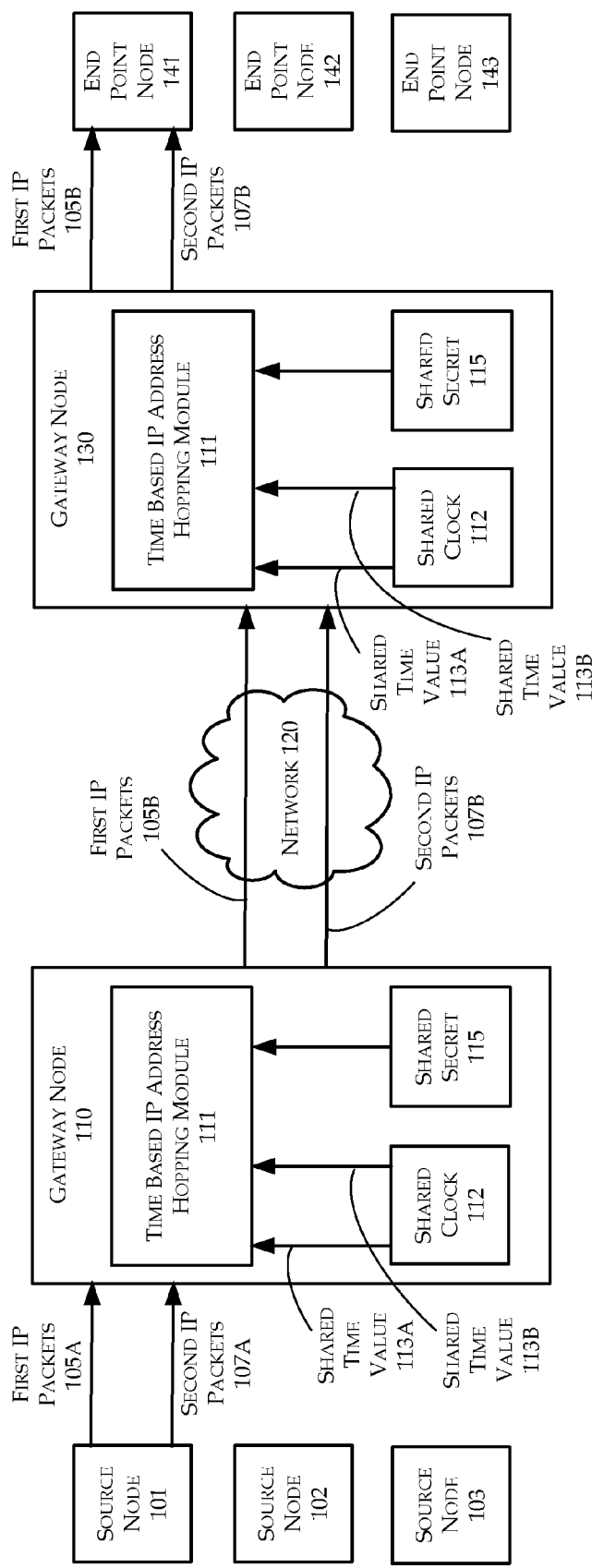
- FIG. 1 is a block diagram illustrating example IP communications between source nodes, gateway nodes, and end point nodes.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to IP communications employing time based IP address hopping. In some examples, IP communications may involve IP network nodes including source nodes, which may configure and send IP packets via a network, gateway nodes, which may receive IP packets from the network and may send the IP packets to end point nodes, and end point nodes. The IP network nodes may hop between different IP addresses, which different IP addresses may be identified at least in part using shared time values.

In an example IP communication session between a source node and an end point node, the source node may configure IP packets with an IP address for the end point node, and the source node may send such IP packets via a network, such as the Internet. The IP packets may be routed via the network to a gateway node that supports communications of the end point node. The gateway node may send the IP packets to the end point node.

In some embodiments, to implement IP address hopping, the source node and gateway node may occasionally change the IP address for the end point node. The source node may hop to a next IP address by identifying the next IP address for the end point node and configuring outgoing IP packets with the next IP address. The gateway node may hop to the next IP address by identifying the next IP address for the end point node and sending IP packets having the next IP address to the end point node. The source node and gateway node may be adapted to identify identical next IP addresses for the end point node, and to synchronize timing of hops to next IP addresses.

As noted herein, IP addresses may be identified using shared time values and shared secrets. Shared time values and shared secrets may be shared, e.g., by the source node and the gateway node. In some embodiments, shared time values may comprise, or may be derived from, current times at which IP addresses are identified. Time values may be shared, for example, by being from a shared clock, such as a clock providing Coordinated Universal Time (UTC) time values. The shared clock may be implemented separately at each of the source and gateway nodes, or may implemented as a network time service from which each of the source and gateway nodes may retrieve the first and second shared time values. Shared secrets may comprise, e.g., shared encryption keys. In some examples, identifying IP addresses may comprise encrypting shared time values using a shared secret and an encryption algorithm, and using encryption algorithm outputs to identify IP addresses.

Any of a variety of approaches may be applied to synchronize timing of hops to next IP addresses. In some embodiments, an initial handshake may establish times for hopping to next IP addresses, either as a pre-calculated series of time values, or as a start time and a time interval. In some embodiments, both source and gateway nodes may be adapted to use default synchronized intervals, e.g., hopping to a next IP address at a point which is 0, 1, 2, 3, 4, 5, . . . seconds into each minute per the shared clock, or at any other predetermined shared clock values.

Some embodiments may comprise sequentially assigning up to a number N of IP addresses to the end point node, and adjusting a time interval between assigning any of the sequential IP addresses to the end point node. By adjusting the time interval, irregular intervals may be employed, e.g., where some intervals may be longer while other intervals may be shorter. Irregular intervals may make predicting timing of hops to next IP addresses more difficult for would-be attackers. Any approach may be used to implement adjusting the time interval, including but not limited to the example approaches described herein.

Before, at, and/or after hopping to a next IP address, both source node and gateway node may discontinue use of a previous IP address in connection with the end point node. In some embodiments, both source node and gateway node may discontinue use of the previous IP address at the time of hopping to the next IP address.

In some embodiments, recognizing that IP packets take variable amounts of time to traverse a network, the source node may be adapted to send a confirmation IP packet, e.g., at the time of hopping to the next IP address. The confirmation IP packet may comprise an indication that a previous IP address may be closed. The gateway node may be adapted to discontinue sending of IP packets addressed to the previous IP address to the end point node in response to the indication, in the confirmation IP packet, that the previous IP address may be closed.

In some embodiments, the gateway node may allow elapse of an overlap time interval subsequent to assigning the next IP address to the end point node and prior to discontinuing sending of IP packets addressed to the previous IP address to the end point node. In other words, during the overlap time interval, the gateway node may send IP packets addressed to both the previous and next IP addresses to the end point node. In some embodiments, durations of overlap time intervals may be adjustable by the gateway node, e.g., when the gateway node drops more than a threshold number of IP packets addressed to the previous IP address, the gateway node may increase an overlap time interval to reduce an IP packet drop rate.

Conversely, embodiments may be configured for burst communications in which source nodes and/or gateway nodes may allow elapse of a time interval between hopping from a previous to a next IP address. Source nodes may, for example, allow elapse of a time interval subsequent to discontinuing use of a first IP address and prior to commencing use of a second IP address. Gateway nodes may for example discontinue sending IP packets addressed to the first IP address to the end point node prior to assigning the second IP address to the end point node.

FIG. 1 is a block diagram illustrating example IP communications between source nodes, gateway nodes, and end point nodes, arranged in accordance with at least some embodiments of the present disclosure. FIG. 1 comprises a source node 101, a source node 102, and a source node 103, a gateway node 110 and a gateway node 130, a network 120, and an end point node 141, an end point node 142, and an end point node 143. Gateway nodes 110 and 130 each comprise a time based IP address hopping module 111, a shared clock 112, and a shared secret 115.

In some embodiments according to FIG. 1, after an initial handshake, a first IP address may be identified by IP address hopping modules 111 at each of gateway nodes 110 and 130. IP address hopping modules 111 may use a first shared time value 113A from shared clocks 112, optionally as well as shared secret 115, to identify the first IP address. IP address hopping module 111 at gateway node 130 may cause gateway node 130 to assign the identified first IP address to end point node 141.

IP address hopping module 111 at gateway node 110 may modify first IP packets 105A addressed to end point node 141 by inserting the identified first IP address as the destination address. The modified first IP packets are referred to as first IP packets 105B. Gateway node 110 may transmit first IP packets 105B via network 120. Network 120 may route first IP packets 105B to gateway node 130. Gateway node 130 may send first IP packets 105B to end point node 141.

Upon elapse of a time interval as may be determined from synchronization parameters exchanged between gateway node 110 and gateway node 130, IP address hopping modules 111 at each of gateway nodes 110 and 130 may each identify a second IP address. IP address hopping modules 111 may use a second shared time value 113B from shared clocks 112, optionally as well as shared secret 115, to identify the second IP address. IP address hopping module 111 at gateway node 130 may cause gateway node 130 to assign the identified second IP address to end point node 141. Gateway nodes 110 and 130 may discontinue sending of IP packets addressed to the first IP address to end point node 141.

IP packets sent from source node 101 to end point node 141 after the elapsed time interval may comprise second IP packets 107A. IP address hopping module 111 at gateway node 110 may write the identified second IP address into second IP packets 107A; thereby producing modified second IP packets 107B. Gateway node 110 may transmit second IP packets 107B via network 120. Network 120 may route second IP packets 107B to gateway node 130. Gateway node 130 may send second IP packets 107B to end point node 141.

The above described IP address hopping operations may continue indefinitely for as long as necessary to support communications with end point node 141. After each next time interval, a next IP address may be identified, the next IP address may be inserted into IP packets, and the IP packets with the next IP address may be sent to end point node 141.

In some embodiments, communications between source node 101 and end point node 141 may comprise two-way communications in which each of source node 101 and end point node 141 may send IP packets to the other. Embodiments may be adapted for IP address hopping in both directions, e.g., by applying the technologies described herein to IP packets sent from source node 101 to end point node 141, as well as to IP packets sent from end point node 141 to source node 101. Furthermore, models according to FIG. 1 may be extended to include additional gateway nodes and source/end point nodes, any of which additional nodes may implement time based IP address hopping to optionally allow three, four, or N-way communications between N different network nodes.

In some embodiments, source nodes 101, 102, and 103 and end point nodes 141, 142, and 143 may comprise computing devices such as Personal Computers (PCs) for personal or business use, in either laptop or desktop configurations. In some embodiments, source nodes 101, 102, and 103 and end point nodes 141, 142, and 143 may comprise any other types of computing devices, including but not limited to mobile devices such as smart phones and tablet devices, television sets, vehicle-based devices or otherwise. Source nodes 101, 102, and 103 and end point nodes 141, 142, and 143 may connect via wired or wireless connections to server type computing devices comprising gateway node 110 and gateway node 130, respectively. Gateway node 110 and gateway node 130 may each be coupled via wired or wireless connections to network 120.

In some embodiments, gateway servers may implement each of gateway nodes 110 and 130. The gateway servers may for example support a Virtual Private Network (VPN) through which source node 101 may communicate with end point node 141, and vice versa. Each of source node 101 and end point node 141 may for example comprise an end point device adapted to connect to the VPN. First and second IP packets 105A and 107A may originate from source node 101, which may be connected to the VPN, and optionally altered forms of first and second IP packets 105B and 107B may be delivered through the VPN to end point node 141.

Some embodiments may omit source nodes 101, 102, and 103, and may instead involve gateway node 110 in the role of a source node. For example, a computing device implementing a combined source/gateway node may comprise an end point device, the end point device comprising a source node adapted to communicate via network 120 with gateway node 130 serving end point nodes 141, 142, and 143. The computing device implementing the combined source/gateway node may furthermore comprise time based IP address hopping module 111, shared clock 112, and shared secret 115. Such embodiments may be employed for example in the context of a gateway node 110 comprising a web server, such as an ecommerce server, a web server for a bank, an email server, or other web server which may advantageously secure IP communications using the techniques disclosed herein.

Shared clocks 112 may generally comprise any clocks adapted to provide substantially same shared time values 113A and substantially same shared time values 113B at each of gateway nodes 110 and 130. Substantially same time values may comprise time values that are identical up to a desired level of accuracy. Such desired level of accuracy may comprise, e.g., minute, second, or any sub-second level accuracy. Time values provided by shared clocks 112 need not necessarily measure time in hours, minutes, or seconds. For example, so-called "Unix time", or so-called "SYSTEMTIME" or "FILETIME" values used in WINDOWS® devices may be used in some embodiments.

In some embodiments, shared clocks 112 may comprise system clocks implemented in hardware or within operating systems of computing devices comprising, e.g., gateway node 110 and/or 130. In some embodiments, shared clocks 112 may comprise synchronized clock applications adapted to run at each of gateway nodes 110 and 130. In some embodiments, shared clocks 112 may comprise clocks synchronized to a standard "network time" or any other common time source. In some embodiments, shared clocks 112 may comprise clocks started within each of gateway nodes 110 and 130 after an initial handshake. In some embodiments, either or both of gateway nodes 110 or 130 may be configured to access a network time service, e.g., a time service available via network 120, to retrieve first and second shared time values 113A and 113B. In some embodiments, shared clocks 112 may comprise any clocks adapted to provide UTC time values, e.g., so that first and second shared time values 113A and 113B may comprise UTC time values, at any desired level of accuracy.

In some embodiments, time based IP address hopping modules 111 may retrieve shared time values, e.g., first and second shared time values 113A and 113B, from shared clocks 112 for use in identifying IP addresses for IP address hopping operations. First and second shared time values 113A and 113B may each comprise current times at the times they are retrieved and also generally corresponding to times when IP addresses are identified. For example, time based IP address hopping modules 111 may retrieve first shared time values 113A, the first shared time values 113A comprising a first current time at shared clocks 112, and time based IP address hopping modules 111 may use first shared time values 113A to identify a first IP address for first IP packets 105B. While there may be some processing related or other operational delay between retrieving first shared time values 113A and identifying the first IP address, in some embodiments such delays may be small in comparison to the time intervals over which identified IP addresses may be used. For example, any processing related delay between retrieving shared time values and identifying a corresponding IP address may be less than 10%, and in some embodiments less than 1%, of the time intervals over which the corresponding IP address may be used. Such shared time values are considered herein to comprise shared time values that are substantially current time values for IP address identification.

After elapse of an interval during which the first IP address is used, time based IP address hopping modules 111 may similarly retrieve second shared time values 113B, the second shared time values 113B comprising a second current time at shared clocks 112, and time based IP address hopping modules 111 may use second shared time values 113B to identify a second IP address for second IP packets 107B. Time based IP address hopping modules 111 may continue using identified IP addresses for designated intervals, and using subsequent current times from shared clocks 112 to identify next IP addresses, in as many cycles as necessary to support communications with end point node 141.

It will be appreciated by those of skill in the art that there may be a wide variety of approaches for using shared time values 113A and 113B to identify IP addresses. This disclosure describes various example approaches but is not limited to any particular approach. In some examples, time based IP address hopping modules 111 may use shared secret 115, e.g., a shared encryption key, and shared time values, e.g., shared time values 113A, 113B, other time values retrieved from shared clocks 112, or values derived from such shared time values, to identify IP addresses. For example, in some embodiments, time based IP address hopping modules 111 may encrypt shared time values 113A and 113B using shared secret 115 and an encryption algorithm, to identify first and second IP addresses for first IP packets 115B and second IP packets 117B, respectively.

Any one of numerous encryption algorithms may be used. Example encryption algorithms include Advanced Encryption Standard (AES) type algorithms, Data Encryption Standard (DES) type algorithms, Pretty Good Privacy (PGP) type algorithms, as well as many others. Time based IP address hopping modules 111 may generate encrypted time value outputs by encrypting shared time values using a shared secret and any such encryption algorithm.

In some embodiments, time based IP address hopping modules 111 may resolve encrypted time value outputs into an IP address from a set of IP addresses supported at gateway node 130. In one example scenario, gateway node 130 may support a set of IPv6 addresses, e.g., from 2001:db8:0:1234:0:567:8:0000 through 2001:db8:0:1234:0:567:8:9999. Time based IP address hopping modules 111 may resolve encrypted time value outputs into IP addresses for example by reducing encrypted time value outputs to a four digit number XXXX, and applying the four digit number to produce an IPv6 address 2001:db8:0:1234:0:567:8:XXXX. Encrypted time value outputs may be reduced to a four digit number for example using hashing techniques or by using first bits, last bits, or other designated bits of encrypted time value outputs, or by any other formula or approach as will be appreciated.

In another example scenario, gateway node 130 may support a set of IPv4 addresses, e.g., from 67.136.210.000 through 67.136.210.000. Time based IP address hopping modules 111 may resolve encrypted time value outputs into IP addresses for example by reducing encrypted time value outputs to a three digit number YYY, and applying the three digit number to produce an IPv4 address 67.136.210.YYY. Encrypted time value outputs may be reduced to a three digit number for example using hashing techniques or by using first bits, last bits, or other designated bits of encrypted time value outputs, or by any other approach as will be appreciated.

While embodiments comprising encrypting shared time values using a shared secret and an encryption algorithm to identify IP addresses are described in detail herein, it should be emphasized that this disclosure is not limited to such embodiments. In some embodiments, shared time values may be used to identify IP addresses without encrypting the shared time values, e.g., by directly resolving shared time values into IP addresses. Some embodiments may indirectly resolve shared time values into IP addresses, e.g., by applying a formula to derive shared intermediate values from shared time values, and resolving the shared intermediate values into IP addresses.

While this disclosure describes time based IP address hopping; the technologies described herein may also be applicable to a variety of network communication protocols other than IP. Embodiments of this disclosure may apply the teachings herein to any network communication protocol, including, for example, IP and User Datagram Protocol (UDP) communications.

Figure 2:
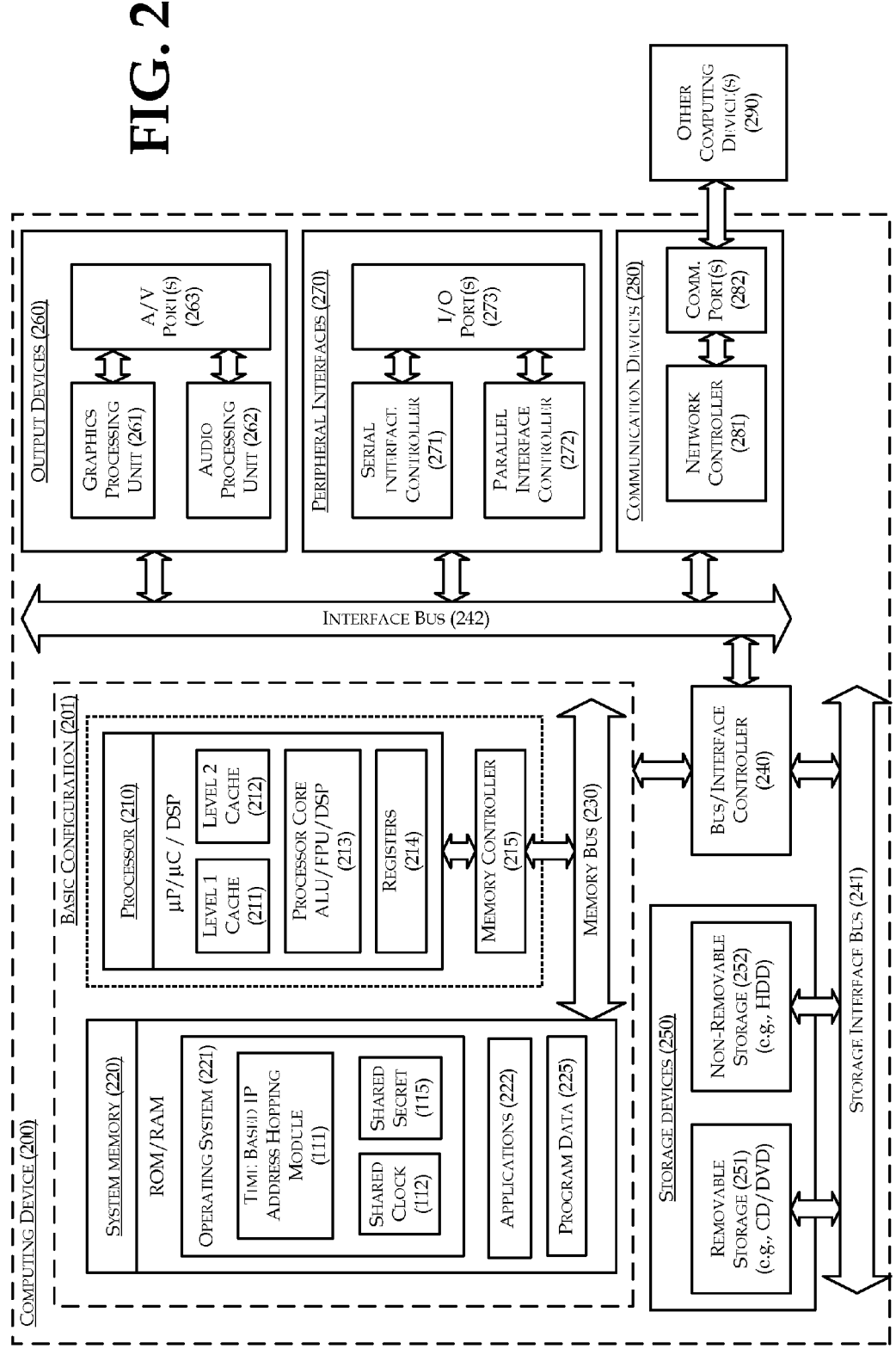
FIG. 2 is a block diagram of a computing device as one example of a gateway server, source node computing device, or other device adapted for time based IP address hopping.

FIG. 2 is a block diagram of a computing device 200 as one example of a gateway server, source node computing device, or other device adapted for time based IP address hopping, arranged in accordance with at least some embodiments of the present disclosure. In a very basic configuration 201, computing device 200 may include one or more processors 210 and system memory 220. A memory bus 230 may be used for communicating between the processor 210 and the system memory 220.

Depending on the desired configuration, processor 210 may be of any type including but not limited to a microprocessor (μP), a microcontroller (μC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. In some embodiments, operating system 221 may comprise a virtual machine that is managed by a Virtual Machine Manager (VMM). In some embodiments, operating system 221 may include, for example, time based IP address hopping module(s) 111, shared clock 112, and shared secret 115. In some embodiments, time based IP address hopping module (s) 111, shared clock 112, and shared secret 115 may be implemented in applications 222 and program data 225, or for example in communication devices 280. Some embodiments may furthermore include a database comprising shared secrets for communications with various different devices, e.g., with a different shared secret for use in communications with different gateway servers.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 211, level 2 cache 212, system memory 220, removable storage 251, and non-removable storage devices 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282. For example, in an embodiment wherein device 200 implements gateway server 130 in FIG. 1, other computing devices 290 may comprise gateway server 110 as well as end point nodes 141, 142, and 143. In an embodiment wherein device 200 implements gateway server 110 in FIG. 1, other computing devices 290 may comprise gateway server 130 as well as source nodes 101, 102, and 103.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a gateway sever adapted to support a VPN. Computing device 200 may also be implemented as a computing device comprising a source node. Computing device 200 may also be implemented as a personal or business use computer including both laptop computer and non-laptop computer configurations.

Figure 3:
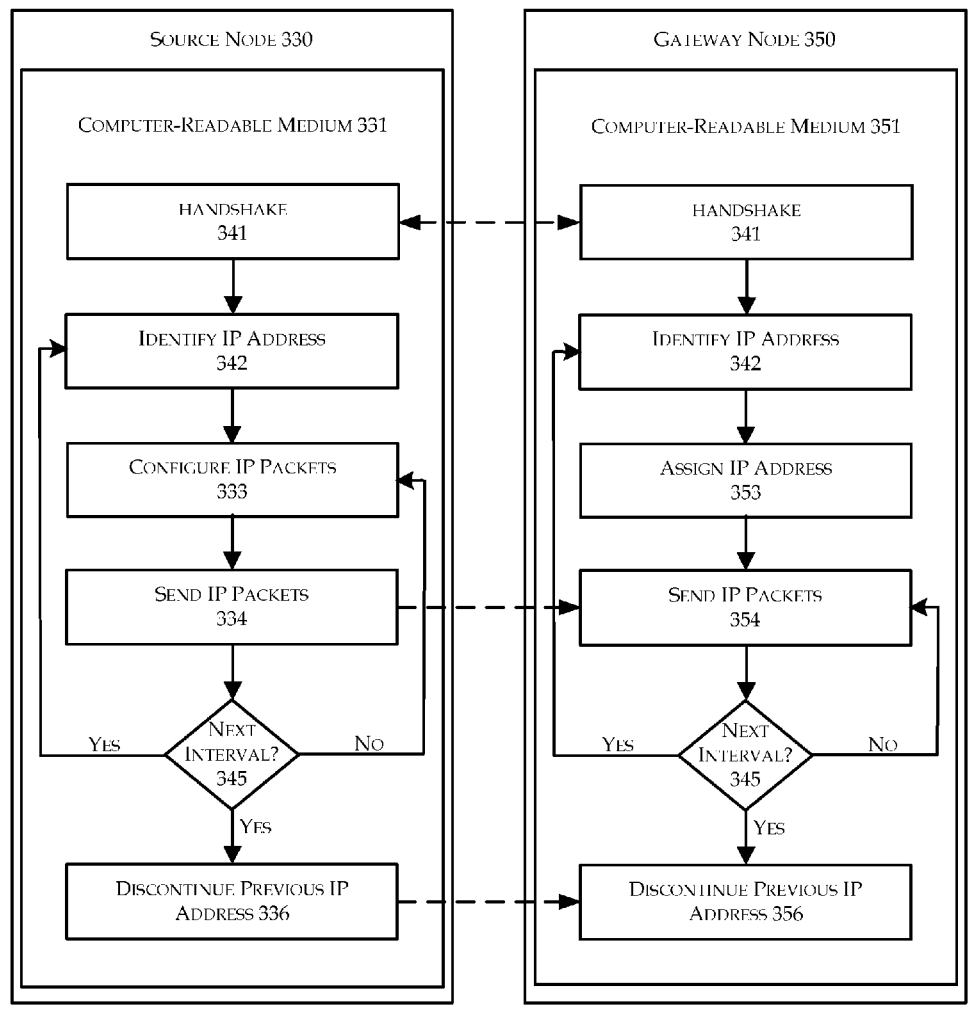
FIG. 3 is a flow diagram illustrating example IP communication methods.

FIG. 3 is a flow diagram illustrating example IP communication methods, arranged in accordance with at least some embodiments of the present disclosure. The example flow diagram includes one or more operations/modules at a source node 330 and one or more operations/modules at a gateway node 350. The example operations/modules at source node 330 are illustrated by blocks 341, 342, 333, 334, 345, and 336. The example operations/modules at gateway node 350 are illustrated by blocks 341, 342, 353, 354, 345, and 356. The illustrated blocks represent operations as may be performed in methods, functional modules in computing devices, and/or instructions as may be recorded on computer readable media 331 at source node 330, or on computer readable media 351 at gateway node 350.

In FIG. 3, blocks 341, 342, 333, 334, 345, and 336 at source node 330, and blocks 341, 342, 353, 354, 345, and 356 at gateway node 350 are illustrated as including blocks being performed sequentially, e.g., with block 341 being performed first and block 336 performed last at source node 330, and with block 341 being performed first and block 356 performed last at gateway node 350. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 3 illustrates example methods by which source node 330 and gateway node 350 may engage in IP communications including time-based IP address hopping. In general, source node 330 and gateway node 350 may each identify next IP addresses at synchronized time intervals, and may use identified next IP addresses to send IP communications to an end point node.

In some embodiments, source node 330 may comprise a gateway node such as 110 in FIG. 1. In some embodiments, source node 330 may comprise a source node such as source node 101 that is itself equipped for time-based IP address hopping, e.g., by including a time-based IP address hopping module 111, which source node need not necessarily connect to network 120 via a gateway node. Instead, such a source node may for example connect to network 120 directly. Gateway node 350 may comprise a gateway node such as gateway node 130 in FIG. 1, and gateway node 350 may support IP communications involving an end point node, such as end point node 141 in FIG. 1. While blocks of FIG. 3 are generally described in the context of three hardware or software elements, e.g., source node 330, gateway node 350, and an end point node supported by gateway node 350, this disclosure is not limited to such hardware or software arrangements.

In FIG. 3, blocks having same identifiers at source node 330 and gateway node 350 may generally perform same or similar operations at source node 330 and gateway node 350, while blocks having different identifiers are used to illustrate differences in methods that may be performed at source node 330 versus gateway node 350, as described in further detail below in connection with individual blocks. In some embodiments, source node 330 and gateway node 350 may engage in two-way communications involving, e.g., in addition to the illustrated blocks, the blocks illustrated at source node 330 being performed at gateway node 350, and the blocks illustrated at gateway node 350 being performed at source node 330. Also, while FIG. 3 generally describes hopping between destination IP addresses, some embodiments may hop between source IP addresses. Such optional extensions of FIG. 3 will be appreciated by those of skill in the art with the benefit of this disclosure.

At a "Handshake" block 341, source node 330 and gateway node 350 may exchange handshake data. An initial handshake between source node 330 and gateway node 350 may confirm that both are equipped with time based IP address hopping modules, may establish synchronization times/time intervals for synchronizing IP address hops, may establish a set of available IP addresses supported by gateway node 350, may confirm that both have access to appropriate shared secrets and shared clocks, and may identify an end point node supported by gateway node 350. Handshake data may include time interval data, IP address set data, shared secret data, shared clock data, and/or end point node identification data as appropriate. Block 341 may be followed by block 342.

At an "Identify IP Address" block 342, source node 330 and gateway node 350 may identify an IP address for IP communications with an end point node. For example, source node 330 and gateway node 350 may first identify a first IP address from a set of IP addresses supported by gateway node 350, and source node 330 and gateway node 350 may subsequently identify, e.g., after next intervals triggered at decision block 345, a second IP address, third IP address, etc. from the set of IP addresses supported by gateway node 350. Block 342 may identify each IP address using a shared time value and a shared secret. Shared time values may comprise, or may be derived from, current times at which each IP address is identified at source node 330 and gateway node 350. Identified IP addresses may be used at the source node 330 and gateway node 350 in connection with IP communications between source node 330, gateway node 350, and the end point node, e.g., the end point node identified in handshake data exchanged at block 341. Block 342 may be followed by block 333 at source node 330; block 342 may be followed by block 353 at gateway node 350.

At a "Configure IP Packets" block 333, source node 330 may configure IP packets for sending to the end point node served by gateway node 350, e.g., by inserting the IP address identified at block 342 as the destination address in the IP packets. Block 333 may be followed by block 334.

At a "Send IP Packets" block 334, source node 330 may send IP packets configured at block 333 via a network. The network may route the IP packets to gateway node 350, e.g., using any IP packet routing approaches known in the art or as may be developed. Block 334 may be followed by block 345.

Meanwhile, at an "Assign IP Address" block 353, gateway node 350 may assign the IP address identified at block 342 to the end point node supported by the gateway node 350. For example, gateway node 350 may maintain an IP address table or other data structure identifying IP addresses and end point nodes supported at gateway node 350. Gateway node 350 may assign an IP address identified at block 342, e.g., a first, second, or subsequent IP address to the end point node identified in handshake data at block 341 by updating its IP address table to correlate IP address identified at block 342 with the end point node. Block 353 may be followed by block 354.

At a "Send IP Packets" block 354, gateway node 350 may send IP packets addressed to an IP address identified at block 342, e.g., a first, second, and/or subsequent identified IP address, to the end point node. IP packets addressed to an identified IP address may be received from the network, e.g. after originating at source node 330. Block 354 may be followed by block 345.

At a "Next Interval?" decision block 345, source node 330 and gateway node 350 may hop to a next IP address when an interval is elapsed for use of an IP address identified at block 342, e.g., when an interval established per handshake data exchanged at block 341 is elapsed for use of the first, second, or subsequent IP address identified at block 342. Hopping to a next IP address may comprise returning to block 342 to identify a subsequent IP address for use in connection with IP communications with the end point node, and discontinuing a previous IP address at blocks 336 or 356. Block 345 may be followed by blocks 342 and 336 at source node 330, and block 345 may be followed by blocks 342 and 356 at gateway node 350.

When an interval is not yet elapsed at decision block 345, source node 330 may continue configuring and sending IP packets per blocks 333 and 334 using a previously identified IP address, e.g., using a first, second, or subsequent identified IP address, as identified at block 342. Gateway node 350 may continue sending IP packets addressed to the previously identified IP address to the end point node per block 354.

Upon return to block 342, source node 330 and gateway node 350 may identify, subsequent to identifying a previous IP address (e.g., a first IP address), a subsequent IP address (e.g., a second IP address) from the set of IP addresses supported by gateway node 350. IP addresses may be identified, e.g., using a second or other subsequent shared time value and the shared secret. The subsequent shared time value may comprise, or may be derived from, a current time at which the subsequent IP address is identified.

At a "Discontinue Previous IP Address" block 336, source node 330 may discontinue use of the IP address previously identified at block 342 as the destination address for IP packets for sending to the end point node. For example, source node 330 may discontinue use of the first IP address as the destination address for IP packets for sending to the end point node. Meanwhile, having identified a next IP address, e.g., a second IP address, at block 342, source node 330 may continue IP communications with the end point node by configuring and sending the second IP packets to the end point node at blocks 333 and 334. In some embodiments, source node 330 may send a confirmation IP packet as described herein.

At a "Discontinue Previous IP Address" block 356, gateway node 350 may discontinue sending IP packets addressed to the IP address previously identified at block 342 to the end point node. For example, gateway node 350 may discontinue sending IP packets addressed to the first IP address to the end point node. Meanwhile, having identified a next IP address, e.g., a second IP address, at block 342, gateway node 350 may continue supporting IP communications with the end point node by assigning the second IP address to the end point node and sending IP packets addressed to the second IP address to the end point node at blocks 353 and 354. In some embodiments, gateway node 350 may await receipt of a confirmation IP packet and/or otherwise allow elapse of overlap time intervals prior to discontinuing a previous IP address at block 356, as described herein.

Figure 4:
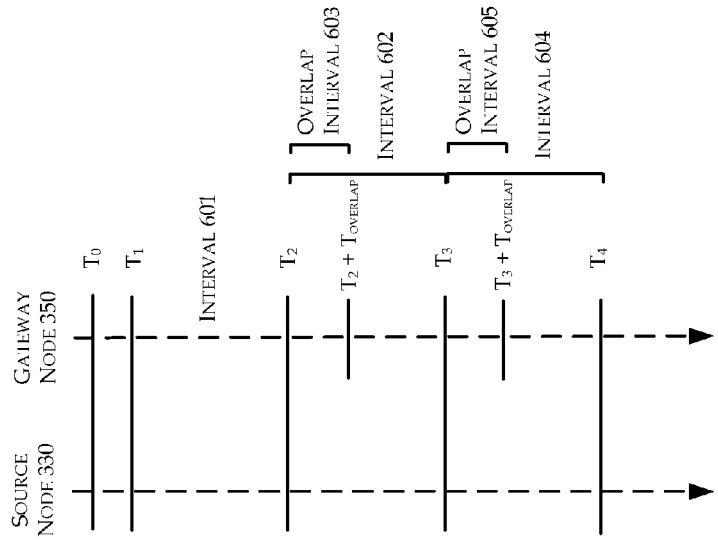
FIG. 4 is a schematic diagram illustrating an example series of intervals, wherein a source node and a gateway node may hop between IP addresses at each interval.

FIG. 4 is a schematic diagram illustrating an example series of intervals, wherein a source node and a gateway node may hop between IP addresses at each interval, arranged in accordance with at least some embodiments of the present disclosure. FIG. 4 illustrates dashed arrow lines representing time at source node 330 and at gateway node 350. Example shared times $T_0$, $T_1$, $T_2$, $T_3$, and $T_4$ are marked, and source node 330 and gateway node 350 may sequentially assign, at times $T_1$, $T_2$, $T_3$, and $T_4$ and thereafter, up to any number N of IP addresses to the end point node, for use in supporting IP communications therewith. Shared times $T_0$, $T_1$, $T_2$, $T_3$, and $T_4$ may be synchronized at source node 330 and gateway node 350 through use of shared clocks as described herein.

In FIG. 4, $T_0$ may comprise a time of initial handshake between source node 330 and gateway node 350. $T_1$ may comprise a time of identification of a first IP address at source node 330 and gateway node 350, e.g., at any time after the initial handshake. $T_1$ may be established at source node 330 and gateway node 350, e.g., by handshake data, by default settings at source node 330 and gateway node 350, by calculations performed at source node 330 and gateway node 350 using, e.g., shared secrets and/or handshake data, and/or by any combination of thereof. $T_1$ may be used by source node 330 and gateway node 350 to identify the first IP address, as described herein.

$T_1$ may be separated from $T_2$ by an interval 401. The first IP address may be used throughout interval 401. The duration of interval 401 may be established at source node 330 and gateway node 350, e.g., by handshake data, by default settings at source node 330 and gateway node 350, by calculations performed at source node 330 and gateway node 350 using, e.g., shared secrets and/or handshake data, by data exchanged during interval 401, and/or by any combination of thereof.

$T_2$ may comprise a time of identification of a second IP address at source node 330 and gateway node 350, e.g., at any time after $T_1$. $T_2$ may be established at source node 330 and gateway node 350, as described above in connection with $T_1$, and/or by data exchanged during interval 401. $T_2$ may be used by source node 330 and gateway node 350 to identify the second IP address, as described herein.

$T_2$ may be separated from $T_3$ by an interval 402. The second IP address may be used throughout interval 402. The duration of interval 402 may be established at source node 330 and gateway node 350, e.g., as described above in connection with interval 401.

$T_3$ may comprise a time of identification of a third IP address at source node 330 and gateway node 350, e.g., at any time after $T_2$. The time $T_3$ may be established at source node 330 and gateway node 350, as described above in connection with $T_2$. $T_3$ may be used by source node 330 and gateway node 350 to identify the third IP address, as described herein.

$T_3$ may be separated from $T_4$ by an interval 403. The third IP address may be used throughout interval 403. The duration of interval 403 may be established at source node 330 and gateway node 350, e.g., as described above in connection with interval 401.

Subsequent to the illustrated times and intervals, source node 330 and gateway node 350 may continue identifying times for IP address identification and interval durations, as described herein, throughout an IP communication session between source node 330 and the end point node supported by gateway node 350.

FIG. 4 also illustrates receiving confirmation packets $P_1$, $P_2$, $P_3$, and $P_4$ at gateway node 350. In some embodiments, discontinuing a previous IP address by source node 330, e.g., as illustrated at block 336 in FIG. 3, may comprise sending confirmation packets, such as such as $P_1$, $P_2$, $P_3$, or $P_4$, comprising indications that a previous IP address may be closed. Source node 330 may for example send confirmation packets $P_1$, $P_2$, $P_3$, and $P_4$ at times $T_1$, $T_2$, $T_3$, and $T_4$ respectively. Gateway node 350 may receive confirmation packets $P_1$, $P_2$, $P_3$, and $P_4$ after times $T_1$, $T_2$, $T_3$, and $T_4$ respectively, as shown. Discontinuing a previous IP address by gateway node 350, e.g., as illustrated at block 356 in FIG. 3, may comprise receiving an IP packet such as $P_1$, $P_2$, $P_3$, or $P_4$, and discontinuing sending of IP packets addressed to the previous IP address to the end point node in response to the indication, in a received packet, that the previous IP address may be closed. In other words, embodiments may allow for intervals, such as the intervals between $T_1$, $T_2$, $T_3$, and $T_4$ and $P_1$, $P_2$, $P_3$, or $P_4$ at gateway node 350, during which gateway node 350 may send IP packets having either of two different IP addresses to the end point node, e.g., intervals between identification of a subsequent IP address, e.g., at $T_2$, and discontinuing the previous IP address, e.g., discontinuing the first IP address after receiving packet $P_2$.

Figure 5:
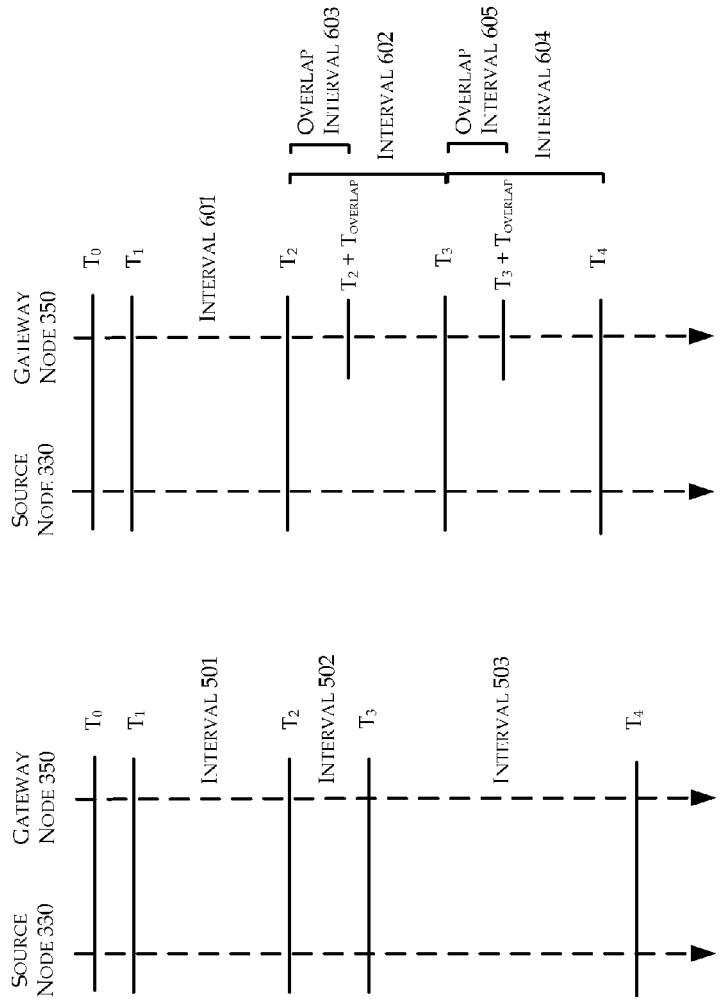
FIG. 5 is a schematic diagram illustrating an example series of non-uniform intervals, wherein a source node and a gateway node may hop between IP addresses at each interval.

FIG. 5 is a schematic diagram illustrating an example series of non-uniform intervals, wherein a source node and a gateway node may hop between IP addresses at each interval, arranged in accordance with at least some embodiments of the present disclosure. As in FIG. 4, FIG. 5 illustrates dashed arrow lines representing time at source node 330 and at gateway node 350. Example shared times $T_0$, $T_1$, $T_2$, $T_3$, and $T_4$ are marked, and source node 330 and gateway node 350 may sequentially assign at times $T_1$, $T_2$, $T_3$, and $T_4$ and thereafter, up to any number N of IP addresses to the end point node, for use in supporting IP communications therewith. Shared times $T_0$, $T_1$, $T_2$, $T_3$, and $T_4$ may be synchronized at source node 330 and gateway node 350 through use of shared clocks as described herein. Shared times $T_0$, $T_1$, $T_2$, $T_3$, and $T_4$ in FIG. 5 are different from shared times illustrated in FIG. 4.

In embodiments according to FIG. 5, source node 330 and gateway node 350 may adjust time intervals between assigning any of the sequential IP addresses to the end point node. For example, in contrast with the uniform intervals illustrated in FIG. 4, FIG. 5 comprises an interval 501, an interval 502, and an interval 503, which intervals are non-uniform by having different durations. In some embodiments, durations of intervals 501, 502, and 503 may be adjusted at source node 330 and gateway node 350 by default to implement stronger security than embodiments adapted to perform IP address hopping at uniform intervals. In some embodiments, durations of intervals 501, 502, and 503 may be adjusted at source node 330 and gateway node 350 in response to user setting selections or to detected security threats.

Figure 6:
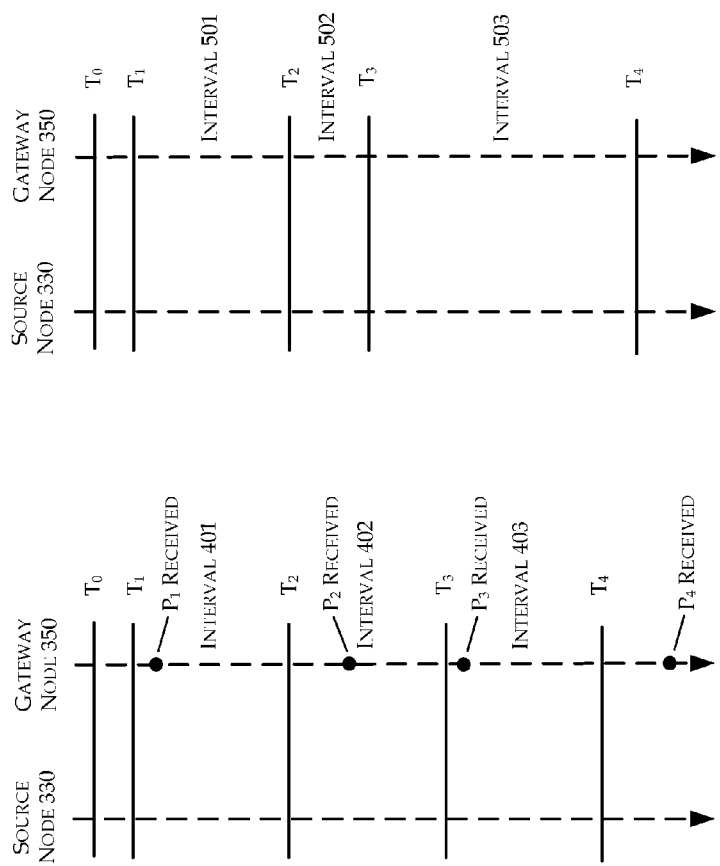
FIG. 6 is a schematic diagram illustrating an example series of intervals, wherein a source node and a gateway node may hop between IP addresses at each interval, and wherein the gateway node may allow elapse of overlap time intervals prior to discontinuing previous IP addresses.

FIG. 6 is a schematic diagram illustrating an example series of intervals, wherein a source node and a gateway node may hop between IP addresses at each interval, and wherein the gateway node may allow elapse of overlap time intervals prior to discontinuing previous IP addresses, arranged in accordance with at least some embodiments of the present disclosure. As in FIG. 4, FIG. 6 illustrates dashed arrow lines representing time at source node 330 and at gateway node 350. Example shared times $T_0$, $T_1$, $T_2$, $T_3$, and $T_4$ are marked, and source node 330 and gateway node 350 may sequentially assign at times $T_1$, $T_2$, $T_3$, and $T_4$ and thereafter, up to any number N of IP addresses to the end point node, for use in supporting IP communications therewith. Shared times $T_0$, $T_1$, $T_2$, $T_3$, and $T_4$ may be synchronized at source node 330 and gateway node 350 through use of shared clocks as described herein. Shared times $T_0$, $T_1$, $T_2$, $T_3$, and $T_4$ in FIG. 6 may be different from those illustrated in FIG. 4 and FIG. 5.

FIG. 6 comprises an interval 601, an interval 602, and an interval 604, which intervals are analogous to, e.g., intervals 401, 402, and 403 in FIG. 4, or intervals 501, 502, and 503 in FIG. 5. FIG. 6 also comprises an overlap interval 603 between time $T_2$ and a subsequent time identified as $T_2+T_{OVERLAP}$, and an overlap interval 605 between time $T_3$ and a subsequent time identified as $T_3+T_{OVERLAP}$. In embodiments according to FIG. 6, gateway node 350 may allow elapse of overlap time intervals subsequent to assigning any IP address to the end point node and prior to discontinuing sending of IP packets addressed to any previous IP address to the end point node. For example, gateway node 350 may allow elapse of overlap time interval 603 subsequent to assigning the second IP address to the end point node at time $T_2$, and prior to discontinuing sending of IP packets addressed to the first IP address, identified using time $T_1$, to the end point node. Gateway node 350 may discontinue sending of IP packets addressed to the first IP address to the end point node upon the elapse of overlap time interval 603.

In some embodiments according to FIG. 6, gateway node 350 may be adapted to adjust overlap time intervals prior to completing transitions between any sequential IP addresses. For example, overlap time intervals may be non-uniform and durations of overlap time intervals may be adjusted at gateway node 350 to improve IP packet throughput and/or to strengthen security. In some embodiments, gateway node 350 may lengthen overlap time intervals in response to determining, at gateway node 350, that more than an acceptable number of IP packets are being dropped. Embodiments may for example establish a threshold acceptable IP packet drop rate, and may adjust overlap time intervals when the drop rate for IP packets addressed to previous IP addresses exceeds the threshold. In some embodiments, gateway node 350 may shorten overlap time intervals to implement a security setting, e.g., in response to a user selected strong security setting, and/or in response to detected conditions indicating presence of security threats such as DoS or eavesdropping type attacks.

FIG. 7 is a schematic diagram illustrating an example series of burst intervals separated by communication gaps, wherein a source node and a gateway node may hop between IP addresses at each burst interval, arranged in accordance with at least some embodiments of the present disclosure. As in FIG. 4, FIG. 7 illustrates dashed arrow lines representing time at source node 330 and at gateway node 350. In FIG. 7, shared times $T_0$, $T_1$, $T_2$, $T_3$, $T_4$, $T_5$, and $T_6$ may be synchronized at source node 330 and gateway node 350 through use of shared clocks as described herein. Shared times $T_0$, $T_1$, $T_2$, $T_3$, $T_4$, $T_5$, and $T_6$ in FIG. 7 may be different from those illustrated in FIG. 4, FIG. 5, and FIG. 6.

In FIG. 7, a communication interval 701 between $T_1$ and $T_2$ is followed by a gap 711 between $T_2$ and $T_3$. A communication interval 702 between $T_3$ and $T_4$ is followed by a gap 712 between $T_4$ and $T_5$. A communication interval 703 between $T_5$ and $T_6$, and any subsequent communication intervals, may similarly be followed by gaps such as gaps 711 and 712. In embodiments according to FIG. 7, source node 330 and gateway node 350 may be adapted for burst communications by sequentially assigning, at times $T_1$, $T_3$, $T_5$, and thereafter, up to any number N of IP addresses to the end point node, for use in supporting IP communications therewith. Source node 330 and gateway node 350 may be adapted to allow synchronized gaps such as 711 and 712 between intervals 701, 702, and 703 during which each IP address is used. For example, source node 330 may be adapted, e.g., at block 336 in FIG. 3, to allow elapse of a gap time interval subsequent to discontinuing use of a previous IP address, and prior to sending IP packets configured with a subsequent IP address via the network. Gateway node 350 may be adapted, e.g., at block 356 in FIG. 3, to discontinue sending IP packets addressed to a previous IP address to the end point node prior to assigning, e.g. after gap 711, a subsequent IP address to the end point node.

Various combinations of embodiments according FIG. 4, FIG. 5, FIG. 6, and/or FIG. 7 may be made in some embodiments. For example, some embodiments may use confirmation packets as described in connection with FIG. 4 in combination with non-uniform intervals as described in connection with FIG. 5. Some embodiments may use confirmation packets as described in connection with FIG. 4 in combination with overlap intervals as described in connection with FIG. 6—e.g., by gateway node 350 discontinuing usage of a previous IP address either in response to a received confirmation packet, or in upon elapse of an overlap interval, whichever is first. Any other combinations of features described in connection with FIG. 4, FIG. 5, FIG. 6, and/or FIG. 7 may be made to implement embodiments of this disclosure.

FIG. 8 is a block diagram illustrating example IP communications between a gateway nodes, arranged in accordance with at least some embodiments of the present disclosure. FIG. 8 includes a gateway node 805 and a gateway node 825, where gateway node 805 and gateway node 825 implement a virtual network 850 using a VPN bridge 880 across network 120. Gateway node 805 and gateway node 825 are each configured to access shared clock 112. Gateway node 805 supports an address array 810 comprising IP address 811 among other IP addresses in address array 810. Gateway node 825 supports an address array 830 comprising IP address 833 and IP address 835 among other IP addresses in address array 830.

In FIG. 8, gateway node 805 and a gateway node 825 may support communications between gateway node 805, or a source node device at gateway node 805 side of virtual network 850, and an end point node at a gateway node 825 side of virtual network 850. Gateway node 805 and gateway node 825 may hop from using a first IP address, e.g., IP address 833, for the end point node, to using a second IP address, e.g., IP address 835, for the end point node. In some embodiments, gateway node 825 may allow elapse of overlap intervals during which IP packets sent to IP address 833 and IP address 835 are sent to the end point node.

In some embodiments, gateway node 825 may provide to gateway node 805, e.g., in an initial handshake or thereafter, a set of IP addresses in address array 830 for use in identifying IP addresses such as 833 and 835 at gateway node 805. When some IP addresses in address array 830 are occupied by other end point devices, e.g., by end point devices 142 or 143 in FIG. 1, the occupied IP addresses may be excluded from the set of IP addresses provided to gateway node 805, and the occupied/excluded IP addresses may resultantly not be used at gateway node 805 and gateway node 825 to identify next IP addresses.

In some embodiments, VPN bridge 880 may comprise a standard VPN bridge between two or more VPN segments, e.g. between the illustrated segments of virtual network 850. Communication may take place across address arrays 810 and 830, where the IP addresses 811, 833, and/or 835 may be changed in a pseudo random fashion by each gateway in cooperation with the other.

In some embodiments, address selection may be driven, e.g., by a clear text value derived from UTC accessed from shared clock 112. This clear text value may be used to generate IP addresses in address array 810 and/or IP addresses in address array 830, such that active IP addresses are known by both gateways at any point in time.

In some embodiments, gateway node 805 and gateway node 825 may derive IP addresses using encryption keys and a cipher that selects IP addresses from predefined arrays of addresses, such as either address array 810 or address array 830. Gateway node 805 may have access to an encryption key as well as address array 830 for gateway node 825, and gateway node 805 may use encryption key, shared time value, and address array data to identify an active IP address at gateway node 825 at any given time, and vice versa.

In some embodiments, gateway node 805 and gateway node 825 may be adapted to implement aspects of this disclosure in combination with extended private network layer 1 security, including, for example, authentication between gateway servers implementing gateway node 805 and gateway node 825, authorization of gateway servers adapted to implement gateway node 805 and gateway node 825, auditing and alarms on layer 1 events, and/or privacy of data carried on the public network between gateway servers implementing gateway node 805 and gateway node 825.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. An Internet Protocol (IP) communication method for a gateway node adapted to support a Virtual Private Network (VPN), wherein the gateway node serves one or more end point nodes, and wherein the end point nodes comprise end point devices adapted to connect to the VPN, the method comprising:
   exchanging, by the gateway node, handshake data with a source node to establish IP address hopping communication with the source node, wherein the handshake data comprises:
   time interval data to establish synchronized IP address hopping time intervals;
   shared secret data that identifies a shared secret, wherein the shared secret is used to identify IP addresses used in IP address hopping communication; and
   a set of IP addresses supported by the gateway node;
   identifying, by the gateway node, a first IP address, wherein the first IP address is identified from the set of IP addresses supported by the gateway node, wherein the first IP address is identified using a first shared time value and the shared secret, wherein the first shared time value comprises, or is derived from, a current time at which the first IP address is identified, and wherein the first shared time value and the shared secret are shared between at least the gateway node and the source node;
   assigning, by the gateway node, the first IP address to an end point node served by the gateway node;
   sending, by the gateway node, IP packets addressed to the first IP address to the end point node;
   subsequent to elapse of a synchronized time interval, wherein the synchronized time interval is synchronized with the source node according to the time interval data exchanged in the handshake data, and subsequent to identifying the first IP address, identifying, by the gateway node, a second IP address from the set of IP addresses supported by the gateway node, wherein the second IP address is identified using a second shared time value according to the time interval data exchanged in the handshake data and the shared secret, and wherein the second shared time value comprises, or is derived from, a current time at which the second IP address is identified;

assigning, by the gateway node, the second IP address to the end point node served by the gateway node;

sending, by the gateway node, IP packets addressed to the second IP address to the end point node;

allowing, by the gateway node, elapse of an overlap time interval subsequent to assigning the second IP address to the end point node and prior to discontinuing sending of IP packets addressed to the first IP address to the end point node, wherein during the overlap time interval, the gateway node sends IP packets addressed to both the first IP address and the second IP address to the end point node;

subsequent to elapse of the overlap time interval, discontinuing, by the gateway node, sending of IP packets addressed to the first IP address to the end point node;

sequentially assigning, by the gateway node, subsequent to assigning the second IP address, up to a number N of sequentially assigned IP addresses to the end point node;

adjusting, by the gateway node, at least one time interval between assigning any of the sequentially assigned IP addresses to the end point node; and adjusting, by the gateway node, at least one overlap time interval prior to completing at least one transition between any of the sequentially assigned IP addresses.

2. The IP communication method of claim 1, wherein identifying the first and second IP addresses comprises encrypting the first and second shared time values, respectively, using the shared secret and an encryption algorithm.

3. The IP communication method of claim 1, further comprising accessing a network time service to retrieve the first and second shared time values.

4. The IP communication method of claim 1, wherein the first and second shared time values comprise Coordinated Universal Time (UTC) time values.

5. The IP communication method of claim 1, further comprising receiving an IP packet comprising an indication that the first IP address may be closed, and discontinuing sending of IP packets addressed to the first IP address to the end point node in response to the indication that the first IP address may be closed.

6. A non-transitory computer readable storage medium having computer executable instructions executable by a processor, the instructions that, when executed by the processor, implement a Internet Protocol (IP) communication gateway node adapted to support a Virtual Private Network (VPN), wherein the gateway node serves one or more end point nodes, and wherein the end point nodes comprise end point devices adapted to connect to the VPN, wherein the instructions cause the processor to:

exchange, by the gateway node, handshake data with a source node to establish IP address hopping communication with the source node, wherein the handshake data comprises:
time interval data to establish synchronized IP address hopping time intervals;
shared secret data that identifies a shared secret, wherein the shared secret is used to identify IP addresses used in IP address hopping communication; and
a set of IP addresses supported by the gateway node;

identify, by the gateway node, a first IP address from the set of IP addresses supported by the gateway node, wherein the first IP address is identified using a first shared time value and the shared secret, wherein the first shared time value comprises, or is derived from, a current time at which the first IP address is identified, and wherein the first shared time value and the shared secret are shared between at least the gateway node and the source node;

assign, by the gateway node, the first IP address to an end point node served by the gateway node;

send, by the gateway node, IP packets addressed to the first IP address to the end point node;

subsequent to elapse of a synchronized time interval, wherein the synchronized time interval is synchronized with the source node according to the time interval data exchanged in the handshake data, and subsequent to identifying the first IP address, identify, by the gateway node, a second IP address from the set of IP addresses supported by the gateway node, wherein the second IP address is identified using a second shared time value according to the time interval data exchanged in the handshake data and the shared secret, and wherein the second shared time value comprises, or is derived from, a current time at which the second IP address is identified;

assign, by the gateway node, the second IP address to the end point node served by the gateway node;

send, by the gateway node, IP packets addressed to the second IP address to the end point node;

allow, by the gateway node, elapse of an overlap time interval subsequent to assigning the second IP address to the end point node and prior to discontinuing sending of IP packets addressed to the first IP address to the end point node, wherein during the overlap time interval, the gateway node sends IP packets addressed to both the first IP address and the second IP address to the end point node;

subsequent to elapse of the overlap time interval, discontinue, by the gateway node, sending IP packets addressed to the first IP address to the end point node; and sequentially assign, by the gateway node, subsequent to assigning the second IP address, up to a number N of sequentially assigned IP addresses to the end point node;

adjust, by the gateway node, at least one time interval between assigning any of the sequentially assigned IP addresses to the end point node; and adjust, by the gateway node, at least one overlap time interval prior to completing at least one transition between any of the sequentially assigned IP addresses.

7. The non-transitory computer readable storage medium of claim 6, wherein the instructions cause the processor to identify the first and second IP addresses by encrypting the first and second shared time values, respectively, using the shared secret and an encryption algorithm.

8. The non-transitory computer readable storage medium of claim 6, wherein the instructions cause the processor to access a network time service to retrieve the first and second shared time values.

9. The non-transitory computer readable storage medium of claim 6, wherein the first and second shared time values comprise Coordinated Universal Time (UTC) time values.

10. The non-transitory computer readable storage medium of claim 6, wherein the instructions cause the processor to discontinue sending IP packets addressed to the first IP address to the end point node in response to receiving an IP packet comprising an indication that the first IP address may be closed.

11. A computing system configured to provide an Internet Protocol (IP) communication gateway node adapted to support a Virtual Private Network (VPN), wherein the gateway node serves one or more end point nodes, and wherein the end point nodes comprise end point devices adapted to connect to the VPN, comprising:
- a processor;
- a memory; and
- a gateway node stored in the memory and executable by the processor, wherein the gateway node is configured to:
  - exchange handshake data with a source node to establish IP address hopping communication with the source node, wherein the handshake data comprises:
    - time interval data to establish synchronized IP address hopping time intervals;
    - shared secret data that identifies a shared secret, wherein the shared secret is used to identify IP addresses used in IP address hopping communication; and
    - a set of IP addresses supported by the gateway node;
  - identify a first IP address from the set of IP addresses supported by the gateway node, wherein the first IP address is identified using a first shared time value and the shared secret, wherein the first shared time value comprises, or is derived from, a current time at which the first IP address is identified, and wherein the first shared time value and the shared secret are shared between at least the gateway node and the source node;
  - assign the first IP address to an end point node served by the gateway node;
  - send IP packets addressed to the first IP address to the end point node;
  - subsequent to elapse of a synchronized time interval, wherein the synchronized time interval is synchronized with the source node according to the time interval data exchanged in the handshake data, and subsequent to identifying the first IP address, identify a second IP address from the set of IP addresses supported by the gateway node, wherein the second IP address is identified using a second shared time value according to the time interval data exchanged in the handshake data and the shared secret, and wherein the second shared time value comprises, or is derived from, a current time at which the second IP address is identified;
  - assign the second IP address to the end point node served gateway node;
  - send IP packets addressed to the second IP address to the end point node;
  - allow elapse of an overlap time interval subsequent to assigning the second IP address to the end point node and prior to discontinuing sending of IP packets addressed to the first IP address to the end point node, wherein during the overlap time interval, the gateway node sends IP packets addressed to both the first IP address and the second IP address to the end point node;
  - subsequent to elapse of the overlap time interval, discontinue sending IP packets addressed to the first IP address to the end point node;
  - sequentially assign, subsequent to assigning the second IP address, up to a number N of sequentially assigned IP addresses to the end point node;
  - adjust at least one time interval between assigning any of the sequentially assigned IP addresses to the end point node; and
  - adjust at least one overlap time interval prior to completing at least one transition between any of the sequentially assigned IP addresses.

12. The IP communication method of claim 1, wherein the set of IP addresses supported by the gateway node, as identified in the handshake data, includes IP addresses in an address array at the gateway node, and excludes one or more occupied IP addresses in the address array.

13. The IP communication method of claim 1, wherein the gateway node adjusts the at least one overlap time interval prior to completing at least one transition between any of the sequentially assigned IP addresses in order to reduce an IP packet drop rate.

14. The non-transitory computer readable storage medium of claim 6, wherein the set of IP addresses supported by the gateway node, as identified in the handshake data, includes IP addresses in an address array at the gateway node, and excludes one or more occupied IP addresses in the address array.

15. The non-transitory computer readable storage medium of claim 6, wherein the instructions cause the processor to adjust the at least one overlap time interval prior to completing at least one transition between any of the sequentially assigned IP addresses in order to reduce an IP packet drop rate.

* * * * *